United States Patent [19]

Dodt

[11] Patent Number: 4,864,172

[45] Date of Patent: Sep. 5, 1989

[54] METHOD AND APPARATUS FOR COOLING AN EDDY CURRENT POWDER ABSORPTION UNIT

[75] Inventor: Hans-Walter Dodt, Muhltal, Fed. Rep. of Germany

[73] Assignee: Carl Schenck AG, Fed. Rep. of Germany

[21] Appl. No.: 37,930

[22] Filed: Apr. 13, 1987

[30] Foreign Application Priority Data

Jun. 20, 1986 [EP] European Pat. Off. ............ 86108450

[51] Int. Cl.⁴ ................................................ H02K 9/00
[52] U.S. Cl. .................................... 310/59; 310/60 R; 310/105
[58] Field of Search ............. 310/52, 53, 54, 57, 310/58, 59, 60 R, 60 A, 64, 65, 105, 103, 93; 165/174, 169

[56] References Cited

U.S. PATENT DOCUMENTS

| | | |
|---|---|---|
| 2,386,701 | 10/1945 | Martin . |
| 2,571,872 | 10/1951 | Hayes . |
| 2,611,798 | 9/1952 | Hayes . |
| 2,862,120 | 11/1958 | Onsrud ................................. 310/54 |
| 3,371,613 | 3/1968 | Dahlgren ............................... 310/54 |
| 3,430,085 | 2/1969 | Mains .................................... 310/54 |
| 3,447,002 | 5/1969 | Ronnevig .............................. 310/54 |
| 4,516,044 | 5/1985 | Bone ...................................... 310/54 |
| 4,689,513 | 8/1987 | Dodt ...................................... 310/54 |

FOREIGN PATENT DOCUMENTS 0185791 7/1986 European Pat. Off. .

OTHER PUBLICATIONS

European Search Report EP 86108450 dated Feb. 4, 1987.

Primary Examiner—R. Skudy
Attorney, Agent, or Firm—Connolly & Hutz

[57] ABSTRACT

An eddy current power absorption unit has a particular cooling system which alleviates overheating of the unit and its individual components. Cooling conduits comprising a plurality of meandering paths, each including axially oriented flow lines, are disposed close to the heated components to uniformly remove heat therefrom. The flow velocities at the entrance and exit of the meandering flow paths are generally equal to one another.

3 Claims, 3 Drawing Sheets

METHOD AND APPARATUS FOR COOLING AN EDDY CURRENT POWDER ABSORPTION UNIT

BACKGROUND OF THE INVENTION

The present invention relates to a method of cooling an eddy current brake or power absorption unit by means of a coolant, and also to an eddy current power absorption unit that utilizes such method.

An eddy current power absorption unit (ECPAL) is used to investigate power plants. In use, power delivered by a power plant is converted into heat by means of eddy currents inside the absorption unit. As a result of the eddy currents, the total absorption unit is heated and care must be taken to remove the heat so created.

Existing designs of ECPAUs generally have the disadvantage that their application is limited because at continuous high load the heat created cannot be carried away. As a result of poor heat transfer caused by the shape of the cooling channels and also by the predominantly uneven flow velocity of the coolant in these channels, temperature differentials of significant magnitude occur between the inner wall of the absorption unit facing the rotor and the outer wall thereof. Often these elevated temperatures plastically deform the coolant carrying components. This may result in seizure of the ECPAU or, the elevated temperature as a result of deformation may, after a given time, reach the region of the bearings and may exceed permissible temperatures at those locations. As a result of repeated plastic deformation at relatively high loads cracks often appear in the highly heated zones after relatively short service life. This causes leakage of the coolant into the inner cavity of the unit which renders the unit useless.

SUMMARY OF THE INVENTION

With the above as background, one object of the present invention is to achieve evenly distributed heat transport between entrance and exit of the ECPAU zones to be cooled and uniform heat transfer between the coolant and components to be cooled.

As a result of the design assumption of equal coolant flow velocity at the entrance and the exit of the section to be cooled and because of increased length of the individual coolant passageways, uniform heat transfer and evenly distributed heat transport is achieved within the zones of the ECPAU to be cooled, even in the area of the outer jacket. Through these measures, extension local heat buildup through eddy currents in the upheated material of the ECPAU is definitely avoided even in cases of continuous operation. The method invention herein produces an increase in the service life of an ECPAU of given size.

A particularly suitable ECPAU for the realization of the method has connecting flanges for the power plant to be investigated and stator windings located within the magnetizable portion of the ECPAU. A serrated rotor consists of magnetizable material. Cooling channels are arranged around the rotor and the channels are connected to entrance and exit zones. Uniform heat transport is effected especially through design of the inner walls of the entrance and exit cavities and through their 180° offset toward each other which causes the coolant to flow into the areas to be cooled with the same velocity with which it exits. This arrangement of meandering passageways increases in a remarkable way the length of the individual coolant flow path from entrance to exit zones. Moreover, the entrance and exit cavities starting with the largest distance between the cylindrical outside wall and the inside wall shows a spiral configuration from 0° to 180° and also shows a spiral configuration from 360° to 180°. This arrangement comprises a combination of two partial spirals. As coolant, gaseous as well as liquid media may be used. A preferred number of meandering cooling passageways provides maximum cooling with a minimum of coolant through put.

BRIEF DESCRIPTION OF THE DRAWING

Novel features and advantages of the present invention in addition to those mentioned above will become apparent to persons of ordinary skill in the art from a reading of the following detailed description in conjunction with the accompanying drawing wherein similar reference characters refer to similar parts and in which.

Figure 1:
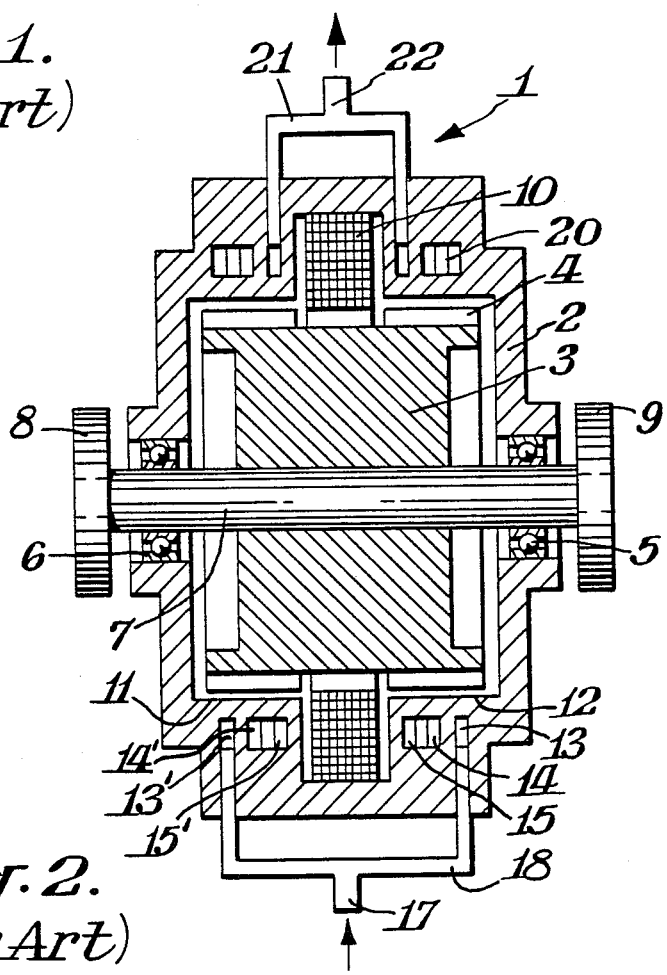
FIG. 1 is a longitudinal sectional view of an ECPAU of known construction, according to the prior art.

Referring in more particularity to FIG. 1, a heretofore proposed and common eddy current brake 1 includes a trunion mounted housing 2 containing a rotor 3 having serrations 4 on its circumference. The rotor is mounted on a shaft 7 journaled to housing 2 by ball bearings 5 and 6. Shaft 7 is equipped with coupling flanges 8 and 9 to which the power plant to be tested may be coupled.

A stationary excitation coil or stator 10 embedded in the housing is positioned radially outwardly from the rotor. The coil is excited by direct current, and as a result, a magnetic field is created on the serrations 4 of the rotor 3. Rotation of the rotor 3 by means of a power plant connected to the coupling flange 9, creates a pulsating magnetic field in the inner walls of 11, 12 of the housing 2 which surround the serrations 4. The pulsating magnetic field has a frequency similar to that of the passing serrations. This creates an eddy current in these walls. The heat created by this process within the inner walls is removed by the cooling medium flowing through cooling channels 13–15 for the right-hand side of the eddy current brake and channels 13'–15' for the left-hand side of the eddy current brake.

The cooling medium flows through inlet 17 and a distribution duct 18 into the cooling channels of the right and left side of the eddy current power brake.

Figure 2:
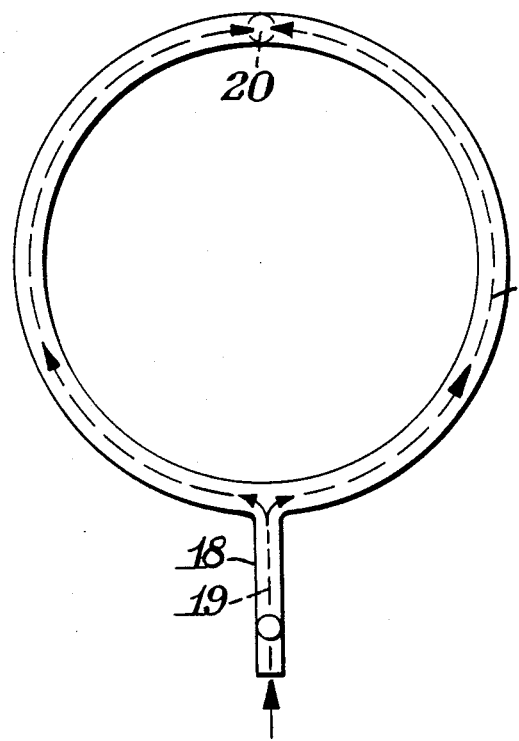
FIG. 2 is a transverse diagrammatic view of the path of the cooling medium in the ECPAU of FIG. 1.
Figure 3:
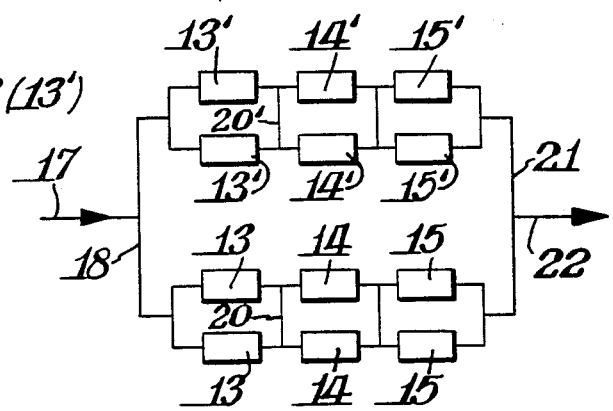
FIG. 3 is a diagrammatic schematic view of the flow of cooling medium through the ECPAU.

The flow pattern of the cooling medium 19 is explained in more detail with reference to FIGS. 2 and 3. Specifically, part of the cooling medium 19 flows via the distribution duct 18 toward the cooling channel 13 while the other part of the cooling medium flows toward the cooling channel 13'. Within the cooling channels 13, 13' the cooling medium is divided once more and is transported to a transition opening 20 as a result of the pressure created by a cooling medium pump. From the transition openings 20, 20', the cooling medium is guided into the next ring of the cooling channel 14, 14' where it is again divided and further conducted toward cooling channel 15, 15'. From this location the cooling medium is released in heated condition via a confluence duct 21 into and through the outlet 22.

Because the cooling medium is guided inside the annular cooling channels 13-15 and 13'-15', the housing 2 is not cooled evenly in the region of the inner walls 11, 12. Also, due to the small size of the cooling channels, the likelihood of clogging exists. When the channels are made large in size to lessen the possibility of clogging, the cooling action is reduced and the final cooling result is further reduced. Since the temperature of the inner walls 11, 12 is considerably higher than the temperature of the outer wall of the housing 2, it is understandable that, as a result of such annular cooling channels, the housing will distort after prolonged service. This gives rise to extreme heat loads of such eddy current power brakes and also to distortions of the housing. This finally results in cracking of the components carrying the cooling medium or seizure of the eddy current brake.

DETAILED DESCRIPTION OF THE INVENTION

Figure 4:
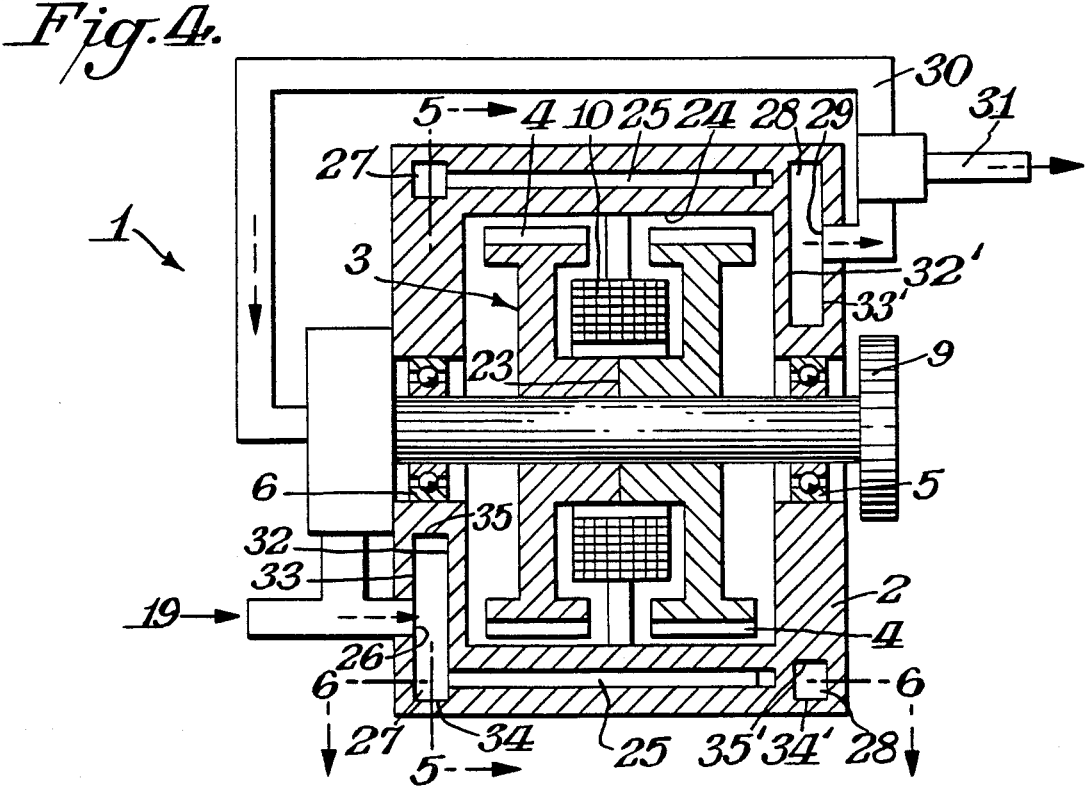
FIG. 4 is a longitudinal sectional view of an ECPAU, according to the present invention.

FIG. 4 illustrates an ECPAU, according to the invention. In the house 2 of the ECPAU, a rotor 3 has serrations 4 and is supported by ball bearings 5, 6. The ECPAU has a connecting flange 9 to which a power plant to be investigated can be connected. The ECPA to the invention also includes an excitation coil or stator 10 which protrudes into the rotor 3.

Figure 5:
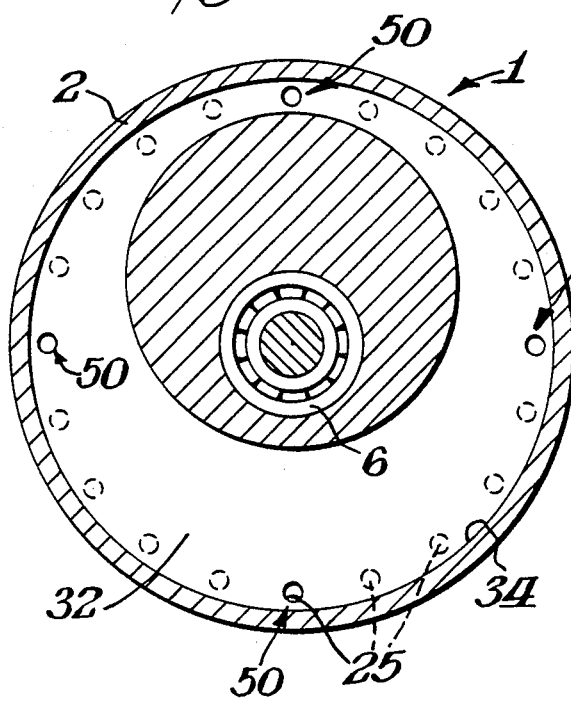
FIG. 5 is a sectional view taken along line 5—5 of FIG. 4.
Figure 6:
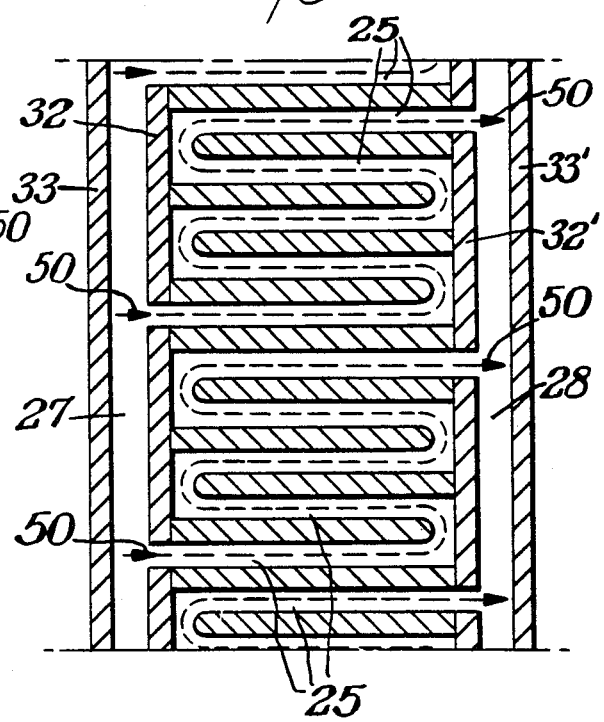
FIG. 6 is a sectional view taken along line 6—6 of FIG. 4.

Division of the rotor 3 in the area 23 into two parts makes it possible that the serrations 4 surround the excitation coil 10 as shown. The serrations are only interrupted in the area where the excitation coil 10 is fastened to the housing 2. Otherwise, the function of the ECPAU is the same as already explained in connection with the ECPAU of FIG. 1. In the case of the present invention, a continuous cylindrical inner wall 24 forms a surface along which run in close proximity the serrations 4 of the rotor 3. The cylindrical inner which become heated for reasons explained above is surrounded by axially oriented straight cooling channels 25 located in the cylindrical wall of housing 2. The partially closed straight cooling channels 25 are uniformly arranged on the circumference of the cylindrical wall of housing 2 as shown in FIG. 6. The channels form a meandering pattern of cooling medium flow lines 50 so that the individual cooling paths within the cylinder wall are significantly longer. This results in improved cooling even though the total required coolant volume is less. The four cooling medium flow lines 50 are shown in the embodiment of the invention illustrated in FIGS. 4-6.

Coolant 19 enters via an entrance opening 26 into an eccentrically arranged entrance cavity 27. From cavity 27, coolant 19 flows through each of the plurality of straight cooling channels 25 to an eccentrically arranged exit cavity 28 and from there through exit opening 29 either via a return line 30 back to the entrance opening 26 or it leaves via exit 31. The coolant flows back and forth along the plurality of the cooling channels 25 of each cooling path. The entrance and exit cavities are similar in shape and contour with each oriented 180° out of phase with the other. The entrance cavity as well as the exit cavity are formed by the frontal walls 32, 32' of the housing of the ECPAU and by the cover walls 33, 33' which are integrated into the absorption unit and which carry the entrance opening 26 and the exit opening 29, respectively. These walls define the axial limitations for the entrance and exit cavities. In the radial direction, the entrance and exit cavities are defined by the cylindrical wall 34 and 34', respectively, and the inner eccentric wall 35, 35', respectively.

Figure 7:
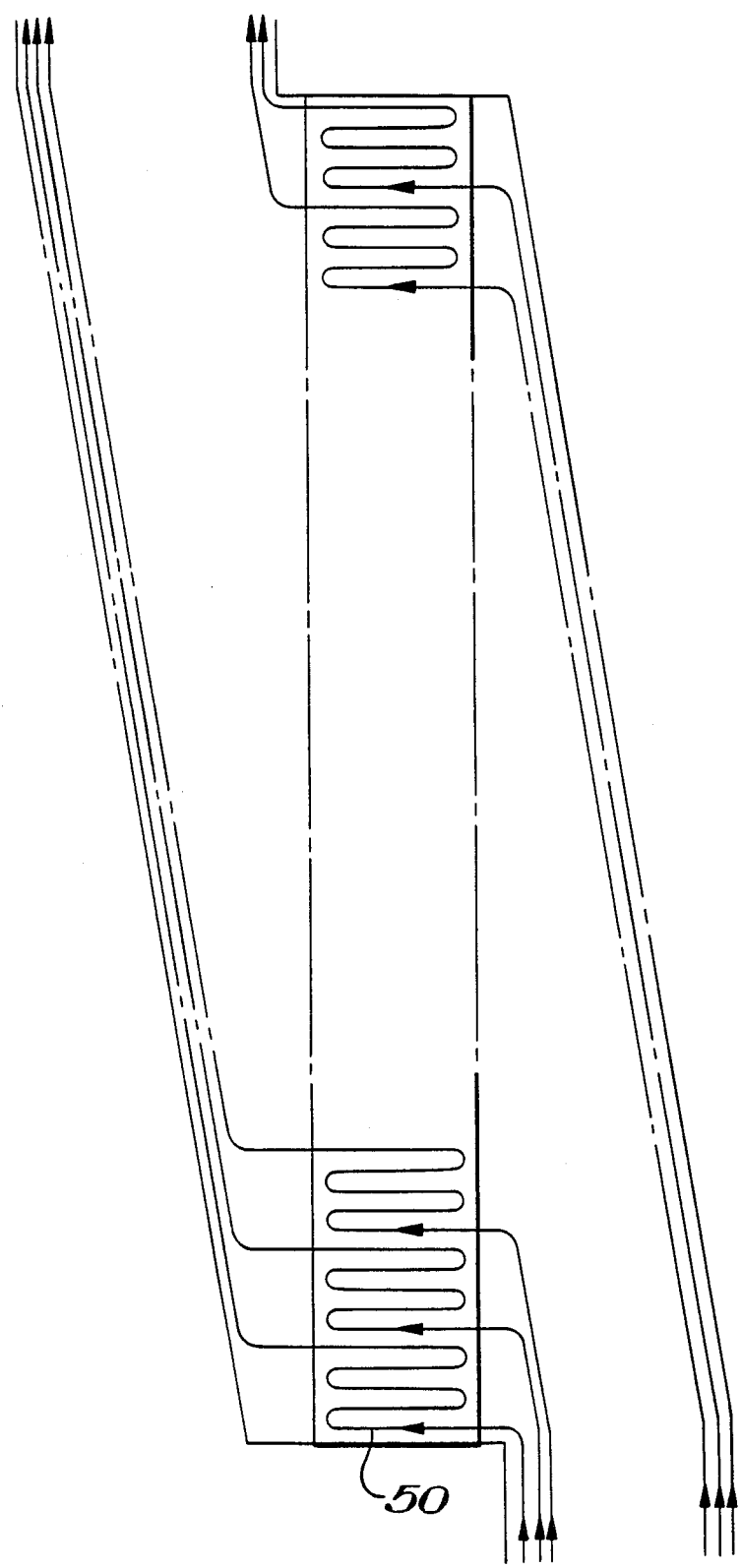
FIG. 7 is a diagrammatic view illustrating the paths of cooling medium through the ECPAU of the present invention.

As a result of the eccentric configuration of the entrance cavity 27 and the exit cavity 28, the entrance opening 26 is staggered 180° with respect to the exit opening 29. This results in a distribution of the cooling medium flow so that each flow line possesses equal flow velocity at the entrance and exit of the cooling channels. The zones of the ECPAU to be cooled will receive cooling flow in such a manner that for each cooling path (see FIG. 7), an identical flow velocity is obtained. Moreover, the overall length of each meandering flow path from entrance to exit is the same.

I claim:

1. A method of cooling an eddy current power absorption unit having a cylindrical wall and heated by eddy currents comprising the steps of flowing a cooling medium through the absorption unit along a plurality of individual flow lines of substantially equal overall length from a cooling medium entrance at one end wall of the unit to a cooling medium exit at the opposite end wall thereof, locating a portion of each flow line in the cylindrical wall of the power absorption unit, and arranging each of the flow line portions in the cylindrical wall so that the cooling medium flows back and forth along paths in the cylindrical wall parallel to one another and parallel to the longitudinal axis of the cylindrical wall, and wherein the flow rate of the cooling medium through each of the pluralities of the flow lines is the same.

2. An eddy current power absorption unit comprising a housing having opposite side walls and an interconnecting cylindrical wall, a stator within the housing, a rotor journaled between the opposite side walls of the housing constructed and arranged to cooperate with the stator in the production of eddy currents, an entrance cavity for cooling medium in one side wall of the housing, an exit cavity for cooling medium in the other side wall of the housing, a plurality of cooling medium flow lines of substantially equal overall length in the cylindrical wall of the housing extending between the entrance and exit cavities, each cooling medium flow line having equally spaced apart axially aligned cooling channels parallel to one another defining a meandering flow pattern through the cylindrical wall, the entrance and exit cavities for the cooling medium each having an outer cylindrical surface concentric with the axis of rotation of the rotor and an inner cylindrical surface eccentric with the axis of rotation of the rotor, an input opening in the entrance cavity located in the area of maximum distance between the inner and outer cylindrical surfaces thereof, a discharge opening in the exit cavity located in the area of maximum distance between the inner and outer cylindrical surfaces thereof, and the input and discharge openings being spaced approximately 180° from each other.

3. An eddy current power absorption unit as in claim 2 including four cooling medium flow lines of substantially equal length in the cylindrical wall of the housing.

* * * * *